United States Patent [19]

Beno

[11] 4,297,528
[45] Oct. 27, 1981

[54] TRAINING CIRCUIT FOR AUDIO SIGNAL RECOGNITION COMPUTER

[75] Inventor: Richard D. Beno, Cerritos, Calif.

[73] Assignee: Interstate Electronics Corp., Anaheim, Calif.

[21] Appl. No.: 73,781

[22] Filed: Sep. 10, 1979

[51] Int. Cl.³ .............................................. G10L 1/00
[52] U.S. Cl. .................................................. 179/1 SB
[58] Field of Search ................. 179/1 SB, 1 SC, 1 SD, 179/1 SF; 340/146.3 T, 146.3 S, 146.3 Q

[56] References Cited

U.S. PATENT DOCUMENTS

| | | | |
|---|---|---|---|
| 3,333,248 | 7/1967 | Greenberg et al. | 340/146.3 T |
| 3,582,559 | 6/1971 | Hitchcock et al. | 179/15.55 R |
| 3,623,015 | 11/1971 | Schmitz | 340/146.3 T |
| 3,812,291 | 6/1972 | Brodes et al. | 179/15.5 ST |
| 4,060,694 | 11/1977 | Suzuki et al. | 179/1 SD |
| 4,181,821 | 1/1980 | Pirz et al. | 179/1 SD |

Primary Examiner—Mark E. Nusbaum
Assistant Examiner—E. S. Kemeny
Attorney, Agent, or Firm—Knobbe, Martens, Olson, Hubbard & Bear

[57] ABSTRACT

A signal pattern recognition system includes a reference pattern memory storing plural reference data patterns against which input patterns are compared for recognition. The reference data patterns are formed by merging training patterns together. Each training pattern, to be accepted for merging, must match the previously merged patterns by a threshold amount. The threshold is automatically varied as the number of previously merged training patterns increases. If a predetermined number of successive training patterns is below the threshold, the training process is repeated, from the beginning, for the reference pattern which generates the errors. The system automatically trains each reference pattern with the same number of training patterns to assure uniformity when input data patterns are compared for recognition.

16 Claims, 4 Drawing Figures

TRAINING CIRCUIT FOR AUDIO SIGNAL RECOGNITION COMPUTER

BACKGROUND OF THE INVENTION

This invention relates to signal pattern recognition systems and, more particularly, to a training circuit used to assure uniform training and increased accuracy in reference patterns in such a system.

Signal pattern recognition systems have been provided in the prior art for use in automatically interpreting data signal patterns, most frequently audible voice signals. Such systems are described, for example, in patents previously issued to the assignee of the present invention, including U.S. Pat. Nos. 3,812,291 and 3,528,559. In addition, a pending patent application, assigned to the assignee of the present invention, Ser. No. 953,901, filed Oct. 23, 1978, now abandoned, and entitled Signal Pattern Encoder and Classifier, discloses a data compression system which is useful in limiting the buffer size required in such apparatus. In addition, a companion case to this application describes an improved buffer for use in accepting new data signals on a continuous basis while at the same time permitting serial accessing of data from the input buffer for test purposes.

Although the present state of the art is advanced, certain inconsistencies in the prior art in the use of training patterns to test and retrain reference patterns in the system's memory have caused inaccuracies in the recognition process, particularly in those systems wherein different reference patterns within the system's memory may be trained on the basis of different numbers of training patterns.

In addition, the prior art has not recognized the fact that, as training proceeds, a higher acceptance threshold should be provided in order to permit a broad range of training patterns in the early training passes, while only permitting a relatively narrow range as the training progresses. Additionally, the prior art has not provided a simple means for adjusting acceptance thresholds for training patterns when the training is undertaken in a noisy environment or through poor quality transmission, such as telephone transmission.

Furthermore, prior art devices have failed to properly handle the situation where training of a reference pattern proceeds with poor input training data, a situation which would indicate a problem in the reference pattern being trained.

SUMMARY OF THE INVENTION

These, and other difficulties, associated with prior art devices are alleviated through the use of the present invention. This invention provides a signal pattern recognition system usable, for example, in voice recognition, which includes a reference pattern memory storing plural reference data patterns. These reference data patterns are compared, one after the other, against input patterns which are to be recognized. The pattern most nearly matching the input pattern is selected for recognition purposes.

The reference data patterns in the system memory are formed by merging training data patterns together. Along this training process, each training pattern, which is to be accepted for merging with the reference pattern, must match the previously merged patterns by a predetermined threshold amount. If the training pattern does not meet this threshold amount, the training pattern is discarded during the training process. The system provides for an automatic variance of the threshold, as the number of previously merged training pattern increases. Thus, early in the training process, a fairly low threshold is utilized in order to permit a broader variety of input training words to be merged. As the training process progresses further, the threshold is increased in order to limit those training patterns which are acceptable for merging with the reference pattern.

In order to alleviate the problem which occurs when a reference pattern no longer meets the input data patterns indicating an erroneous reference pattern, the system includes a circuit for counting the number of successive training patterns which fail to meet the threshold. When a predetermined number of training patterns is below this threshold, the training process is interrupted and begun again so that the ultimate reference pattern will conform to the training data patterns currently being used. The system provides for a variable threshold for permitting training of the reference patterns in noisy backgrounds or when poor transmission, such as telephone transmission, is utilized for training purposes.

Counting circuits are included in order to assure that each of the reference patterns within the reference pattern memory are trained utilizing an equal number of training patterns so that, during the recognition mode of operation, the comparison between a new input signal and the various reference patterns will be uniform and thus yield accurate results.

DESCRIPTION OF THE DRAWINGS

These and other advantages of the present invention are best understood through references to the following detailed description, which references the drawings, in which.

DETAILED DESCRIPTION

Figure 1:
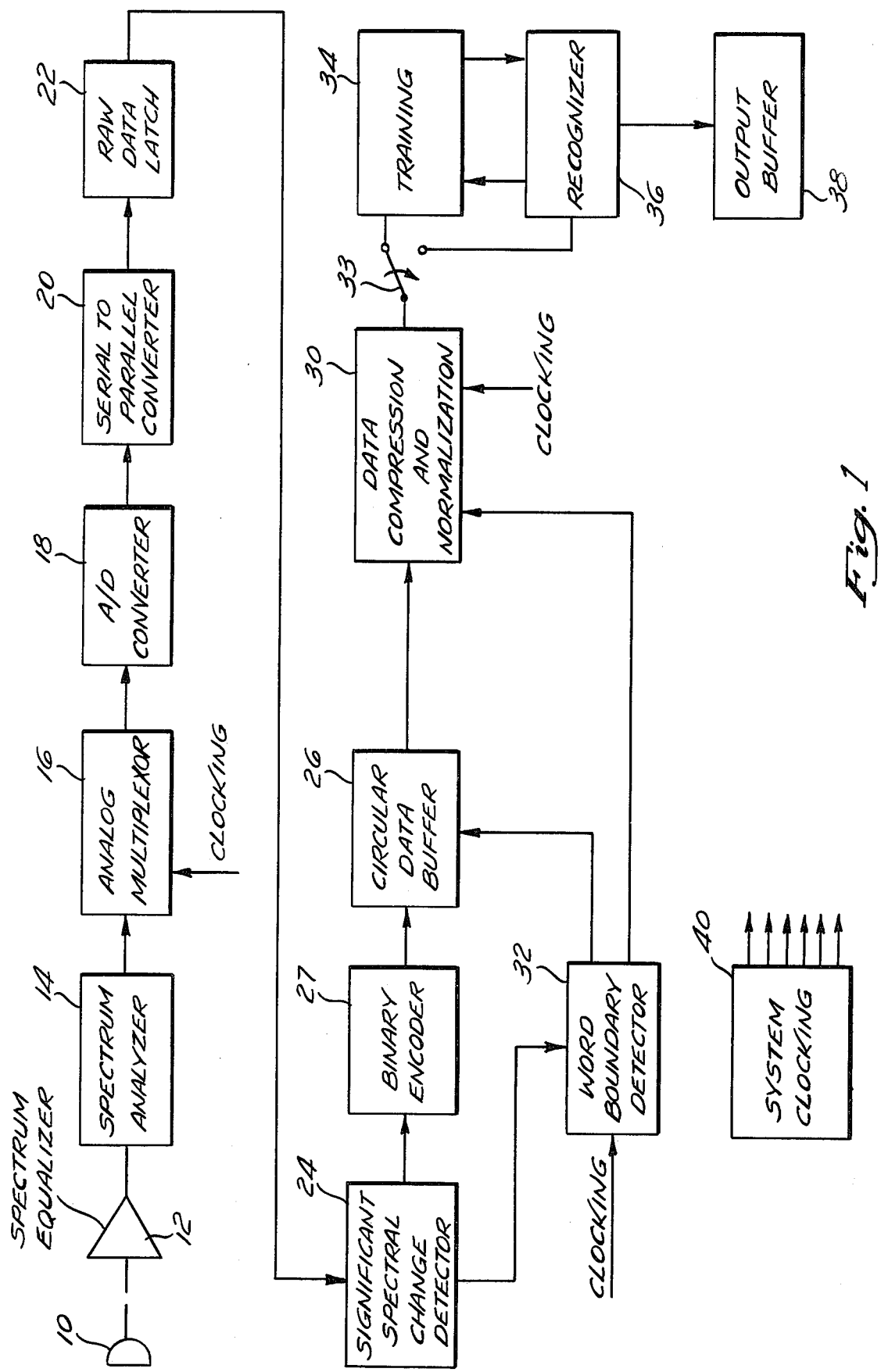
FIG. 1 is a block diagram of the pattern recognition system.

Referring to FIG. 1, a block diagram of the signal pattern encoder and classifier is presented. Audio signals are presented to the device through a transducer 10, which may be any known component such as a microphone or telephone handset and may be remotely located from the rest of the apparatus, as indicated in FIG. 1. Spectrum signals received from the transducer 10 are equalized in a spectrum equalizer 12 prior to transmitting this signal to a spectrum analyzer 14.

The spectrum analyzer 14 filters the output of the spectrum equalizer 12 and divides this into 16 separate and distinct frequency bands. An analog multiplexor 16 receives these 16 separate frequency samples and, in response to a signal from a system clocking mechanism 40, serially feeds the 16 frequency bands into an analog-to-digital converter 18. The converter 18 changes each of the 16 analog signals received from the multiplexor 16 into separate, eight-bit digital signals representative of the analog signal received. These 16 digital signals are serially fed into a serial-to-parallel converter 20, which presents those signals in parallel form to a raw data latch 22.

A significant spectral change detector 24 receives data from the latch 22 and compares this incoming data with that of the most recently accepted spectral sample in a manner which was described in the currently pending application filed by James W. Glen and Joseph C. Brown on Oct. 23, 1978, Ser. No. 953,901, entitled SIGNAL PATTERN ENCODER AND CLASSIFIER. That application, along with U.S. Pat. Nos. 3,812,291 and 3,582,559, previously issued to the assignee of this application, are hereby incorporated in this application by reference. A binary encoder 27 receives the data accepted by the change detector 24 and encodes that data into a binary form. In addition, a word boundary detector 32 also receives a signal from the change detector 24 and then, by sensing a series of low level or high level changes, determines the end or beginning, respectively, of individual utterances. The boundary detector 32 is further connected to a circular data buffer 26 and a data compression and normalization circuit 30. The operation of binary encoder 27, word boundary detector 32, and data compression and normalization 30 are described in the pending application of Glen et al.

Figure 3:
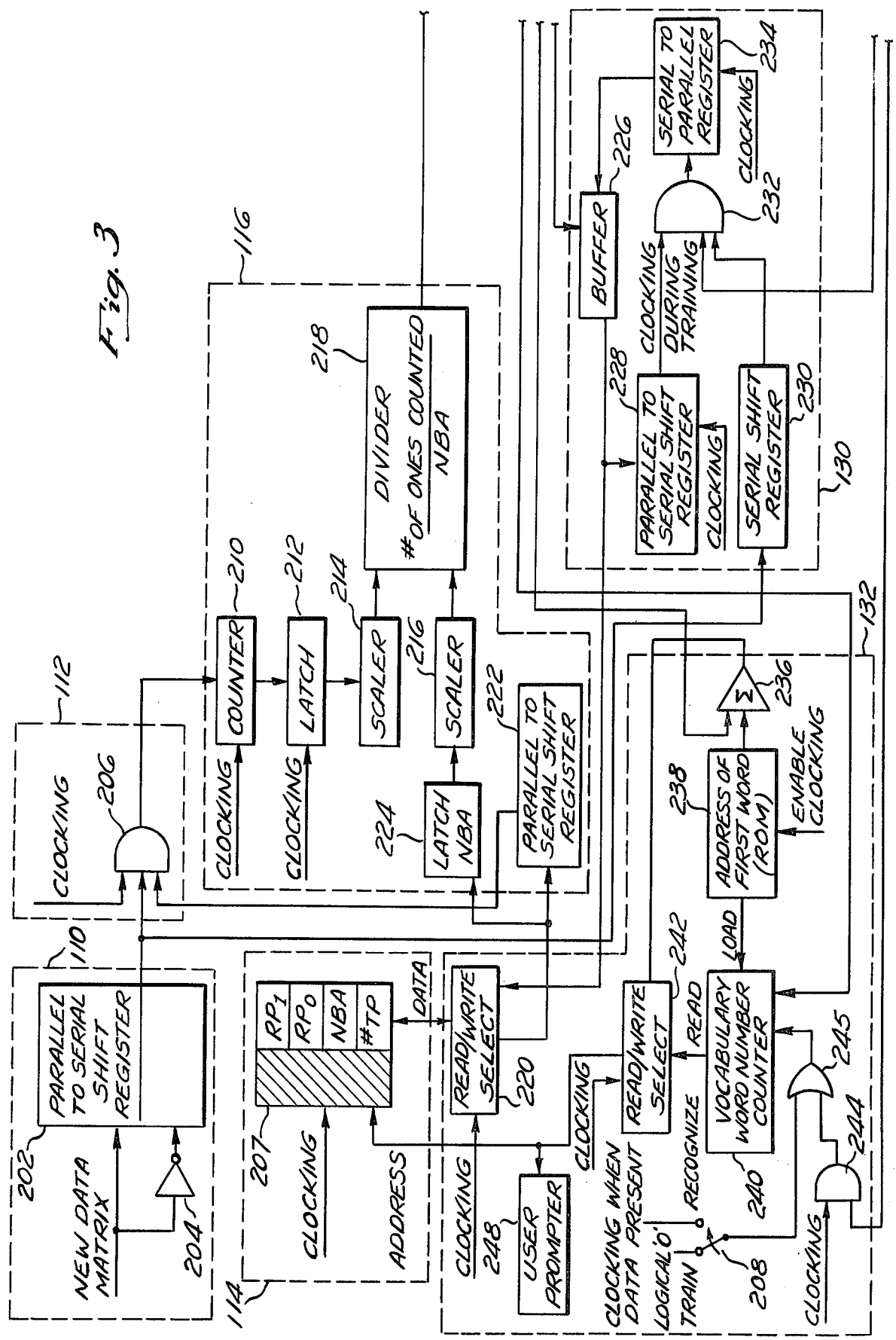
FIGS. 3 and 4 form a composite detailed circuit diagram of the training circuit shown in FIG. 2.

The circular data buffer 26 replaces the coded data buffer 45 of FIG. 3 of the Glen et al application filed Oct. 23, 1978. This particular device is disclosed in a co-pending application filed by Byung H. An, and entitled AUDIO SIGNAL RECOGNITION COMPUTER, assigned to the assignee of this invention. The circular data buffer 26 provides a means whereby signal data may be continually received into the data buffer 26 at the same time that further compression and normalization of data earlier stored in the data buffer 26 is accomplished by a data compression and normalization circuit 30.

The data compression and normalization circuit 30 operates on a signal from the word boundary detector 32 and a signal from the system clocking device 40, taking data comprising a complete utterance or word from the circular data buffer 26 and further compressing it into a 120-bit binary coded word.

The system disclosed herein may be operated to provide the input for either a training circuit 34 or a recognizer circuit 36. A switch 33 determines in which of the modes the system is operating. The training circuit provides a means of updating the reference patterns utilized in recognizing and classifying incoming audio signals. This system includes a means of maintaining a consistent number of training samples for each reference pattern contained within its storage area, as well as means providing a threshold value for accepting incoming samples which varies in relationship to the number of training samples which have previously been accepted for a particular word under consideration.

The recognizer circuit 36 compares those patterns representing accepted utterances with various patterns of previously accepted utterances to determine which of the patterns the new utterance most clearly resembles. The training and recognizer modes of operation will be described in more detail in a later portion of this section.

An output buffer 38 retains the signal from the recognizer circuit 36, indicating the particular pattern which has been identified, and storing this data for use by associated devices.

The system clocking circuit 40 comprises a means for providing clocking signals used throughout the device by producing the signals in a manner which is commonly known and used by those skilled in the art.

Figure 2:
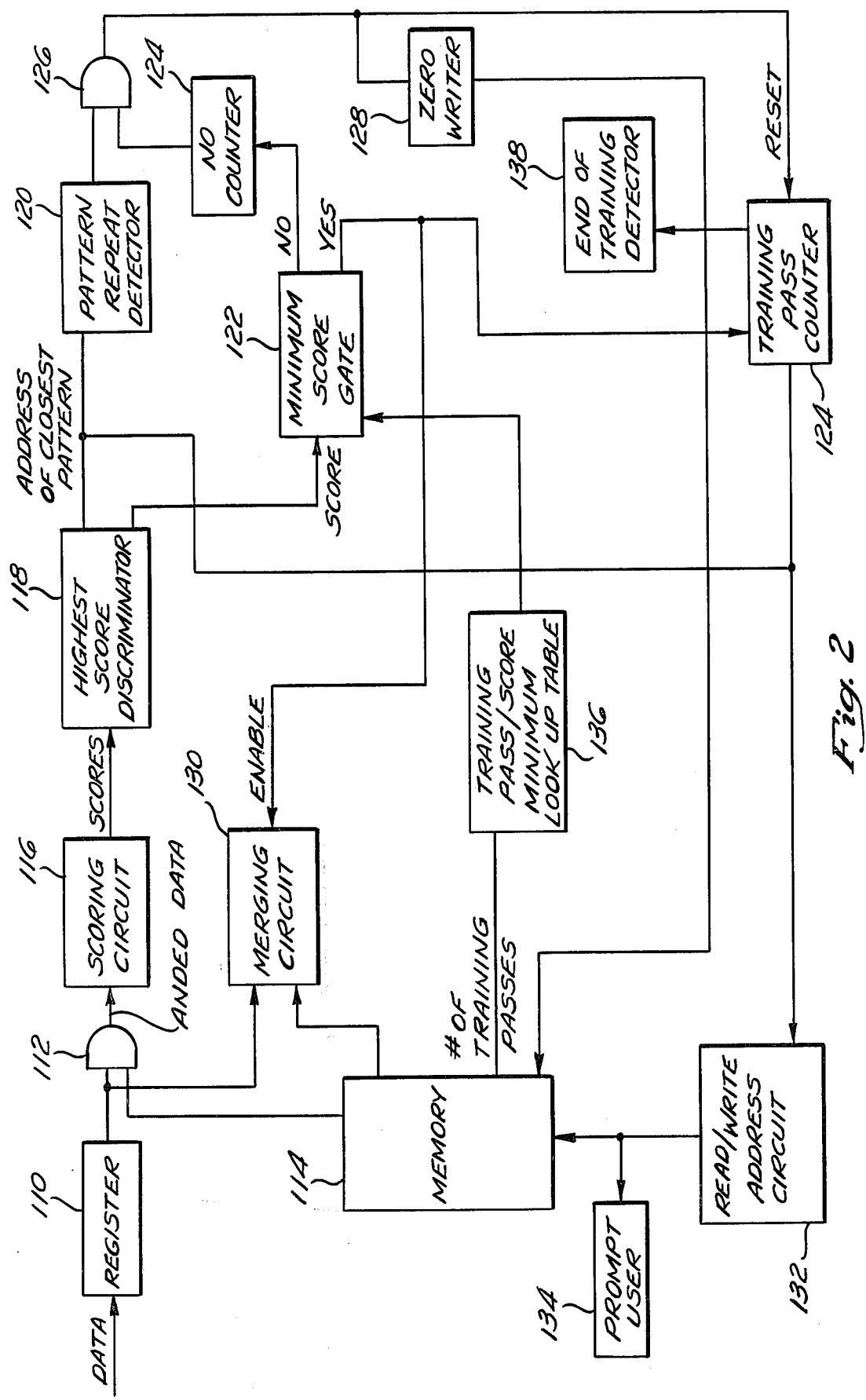
FIG. 2 is a block diagram of the training circuit used in the system of FIG. 1.

The training and recognition circuits 34,36 of the device are shown in the block diagram of FIG. 2 defining the operation of these portions of the device.

Due to the number of commonly shared circuit elements and functions, it will be apparent during the following discussion that the system represented in FIGS. 2 and 3 comprises a combination of the training 34 and recognizer 36 circuits of the audio signal recognition computer as generally shown in FIG. 1.

Output data from the data compression and normalization circuit 30 of FIG. 1 is placed in a register 110 of FIG. 2 where it is also inverted. This inverted data is also stored in the register 110 prior to being tested against previously created reference patterns. The contents of the register 110 are compared with each of the previously stored reference patterns contained in a memory 114 by sequentially placing each bit of the data in the register 110 on one input of an AND gate 112, while the corresponding bit from a reference pattern in the memory 114 is inputted on the other AND gate 112 input. The sequential comparison of the register 110 data continues until all of the reference patterns stored in the memory 114 have been compared with the input data. The sequential data emerging from the AND gate 112 is placed in a scoring circuit 116, where a record of all corresponding bits between the register 110 data and each reference pattern from the memory 114 is individually determined. The scoring circuit 116 also scales each of these data and stores them for future comparison.

The individual data or scores from the scoring circuit 116 are processed by a highest score discriminator 118 in order to determine both the score having the highest magnitude and the reference pattern in the memory 114 which corresponds closest to the pattern input into the register 110.

From the score discriminator 118, the address of the most similar reference pattern is placed in a pattern repeat detector 120 in order to determine whether subsequentially entered audio signals correspond to the same reference pattern. The highest score value is transferred from the discriminator 118 to a minimum score gate 112 wherein it is compared with a threshold value to determine whether the incoming sample corresponds to the most similar reference pattern to a degree which would make it acceptable as a further representation of that pattern in the system.

If the score magnitude in the gate 122 does not reach the threshold level, a Null signal is passed to a null counter 124, which counter 124 is incremented in order to maintain a record of sequential rejections of newly received data. When the null counter 124 has received three Null signals from the score gate 122, it outputs a Logical High signal into an AND gate 126. If the pattern repeat detector 120 indicates that the three nulls defined by the counter 124 correspond to identical patterns, AND gate 126 enables a Zero Write circuit 128 to transfer a zero value to memory 114. The memory 114 stores a count which indicates the number of new signal patterns which have previously been used to generate each reference pattern. The Zero signal from Zero Write circuit 128 replaces this count value with a zero when three attempts are made to retrain a reference signal pattern, and the three attempts provide an unacceptable score from the minimum score gate 122.

When the minimum score gate 122 determines that the score from discriminator 118 has surpassed the threshold value, a Yes signal is generated which enables a merging circuit 130 to merge the newly accepted data with that reference pattern found to most closely correspond in similarity. The pattern resulting from the merge action replaces the previous reference pattern in the memory 114 for future reference use. The Yes signal from the gate 122 also goes to the input of the training pass counter 124, causing that counter to increment by one number. The counter 124 is connected to a Read/-Write address circuit 132, which address circuit generates signals to replace the number of signal patterns previously used to generate the reference pattern in memory 114 by the incremented number from the counter 124.

The training pass counter 124 also provides an output to a user promoter 134, such as an alpha/numeric display, thereby providing a signal to the user of the device that he should input another sample into the device corresponding to that signal with which he has been prompted. The counter 124 also provides a signal to an end-of-training detector 138 wherein the number of passes in said training pass counter 124 are compared with the number of training passes desired or necessary to bring the level of training of the current reference pattern up to a level consistent with that of other reference patterns in the system. The end-of-training detector 138 determines this amount for each separate pattern trained and provides a signal indicating that training has been completed for all system reference patterns when it detects that all patterns have been trained to the required level.

As previously described, the memory 114 stores a signal comprising the number of training passes which have been used to generate each reference pattern stored in this memory 114. This training pass number is transferred to a training pass/score minimum look-up table 136, which look-up table provides a threshold value to be used in the minimum score gate 122 for testing whether the score from discriminator 118 meets the desired threshold value. This threshold value from the look-up table 136 varies according to the number of training passes which any particular reference pattern has experienced. As the number of accepted training passes, which have previously been merged to provide a reference pattern, increases, the minimum acceptable threshold magnitude increases by a corresponding amount. This threshold increase provides for easier establishment of reference patterns in the early training stages, while allowing increased accuracy by stricter acceptance standards when the patterns have become better established in the memory 114.

It should be noted that, upon the transmission of a signal from the AND gate 126 indicating that the most recent input sample has been rejected at least three times, the training pass counter 124 is reset to a value of zero, and thus the number of training samples stored in the memory 114 relating to the reference pattern being retrained is also reset to zero. This provides for complete retraining of the reference pattern, using a low acceptance threshold, with the purpose of providing increased accuracy by assuming that the stored reference pattern was no longer acceptable to meet the requirements of incoming data.

Figure 4:
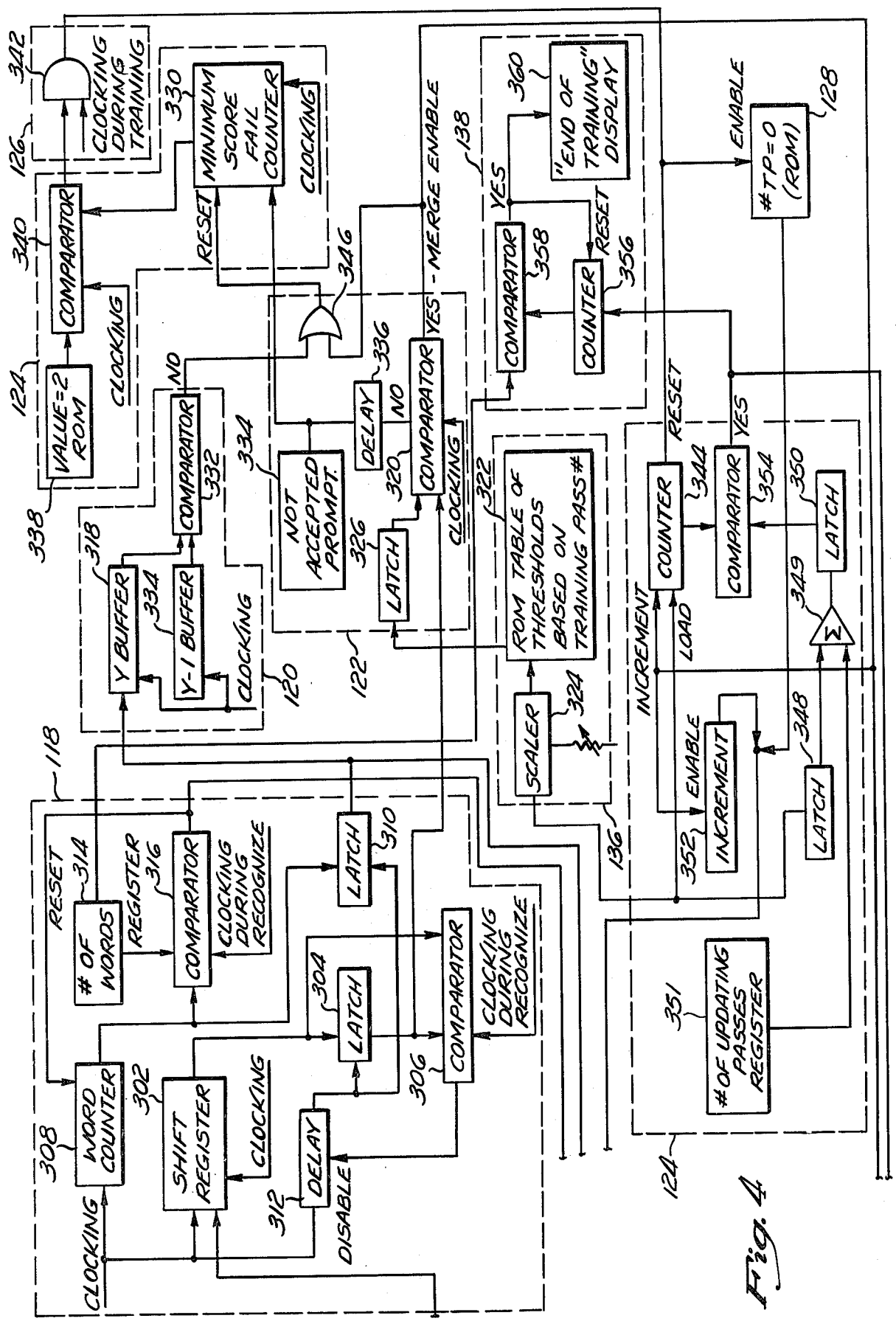

A more detailed description of the system can be made by reference to FIGS. 3 and 4, in conjunction with the block diagram of FIG. 2.

Since the circuits of FIG. 3 and FIG. 4 comprise both the training and recognized modes, and since the operation of the training mode incorporates all operations performed in the recognize mode, it will be assumed that the system as described is operating in the training mode. It will be apparent from the discussion that those portions of the operation not related to training will occur during the operation of the recognize mode in this invention. Because of this assumption, switch 208 of FIG. 3 will be assumed to remain in the training position.

When the data compression and normalization circuit 30 of FIG. 1 produces a new data matrix, this matrix appears on the inputs to the register 110 of FIG. 2, and particularly on the inputs of a parallel-to-serial shift register 202 of FIG. 3. The new data matrix is loaded directly into the shift register 202 and, in addition, the same matrix is inverted in an inverter 204 and is entered into the shift register 202 sequentially below the original data matrix. The contents of the register 202 now become a pattern which will be utilized in the system for comparison with previously stored reference patterns to interpret the new data.

Prior to the entry of data from the data compression and normalization circuit 30 of FIG. 1, the vocabulary word number counter 240 of FIG. 3 has been loaded from an address of first word ROM 238 so that the counter 240 contains as its initial value a number corresponding to the storage address of the first reference pattern in a system memory 207. Within the memory 207 are contained plural reference patterns corresponding to matrix data originally read into the system. These patterns comprise a composite of the original matrices, referred to as rp 1, a composite of the inverted value of these same matrices, referred to as rp 0, a record of the number of bits in agreement for the combination of all data which has been combined to form the reference pattern (NBA) and the number of training passes (#TP) which indicates the number of data matrix samples which have been accepted and merged to create the currently stored reference patterns.

With the first vocabulary word number stored in the counter 240, the first reference pattern to be compared to the incoming data matrix may be read from the memory 207. A Read/Write Select device 242 utilizes the address contents of the counter 240 to indicate the particular word to be read from the memory 207. This word is read from the memory 207 into a Data Read/-Write Select device 220 and is transferred into a parallel-to-serial shift register 222, this data being that which is to be compared with the newly received data matrix.

The contents of the shift register 202 are serially placed upon one input to an AND gate 206, with the corresponding bits of the pattern in the shift register 222 serially placed upon another input to the AND gate 206. The corresponding bits of the two patterns seen on the inputs to the AND gate 206 are serially clocked through this gate 206 by a clocking pulse placed on a third input to the gate 206. Since a signal will pass through the gate 206 only when all three inputs to that gate 206 are high, the output will provide a series of pulses indicating which corresponding bits of the data in matrix 202 and in register 222 are identical. Upon detecting a corresponding high bit, the gate 206 sends a signal to increment a counter 210. The counter value is stored in a latch 212, and is output to a scaler 214 which multiplies the counter value by a constant.

Concurrent to the above scaling, the number of bits in agreement (NBA) of the pattern contained in the register 222 is stored in a latch 224 and is multiplied by a constant for scaling in a scaler 216. After complete comparion of the new data matrix in register 202 with one reference pattern in the memory 207, the scaled number of corresponding ones counted is placed in the numerator input of a divider 218, while the scaled number of bits in agreement from the compared reference pattern is placed into the divider 218 as the denominator input. The results of this division are referred to as the score of the newly accepted data matrix. The actions just described in obtaining this score correspond to that represented in the block 116 of FIG. 2.

The results of the division in the divider 218 are input to the highest scored discriminator 118 of FIG. 2, and particularly into a shift register 302 of FIG. 4. Concurrent to loading the output of the divider 218 into the register 320, the word counter 308 is incremented.

The Clock signal which caused the loading of the register 302 and the incrementing of the counter 308 is also connected through a delay 312 to a latch 304 and a latch 310.

During the training mode, a comparator 306 is not operative, since no clocking signals are placed upon it. Therefore, the clocking signals through the delay 312 are not disabled at any time by the comparator 306 during the training mode.

During the training mode, the contents of the register 302 are clocked into the latch 304 after the Clock signal has passed through the delay 312. At this same time, the contents of the word counter 308, representing the address in the memory 207 at which the reference pattern which is currently being compared is stored, are clocked into the latch 310. If this data meets the minimum threshold requirements, as determined by the minimum score gate 122 of FIG. 2, it will be utilized to update the corresponding reference pattern in the memory 207.

During the recognize mode of system operation, the comparator 306 is clocked in a manner permitting comparison of the contents of the register 302 with the contents of latch 304 which represent the highest score of the previously tested reference patterns. If the comparator 306 determines that the magnitude of the score stored in the register 302 is lower than the score stored in the latch 304, a Disable signal is sent to the delay 312, preventing the clocking signal from passing through the delay 312 and thus prohibiting the transfer of the contents of the register 302 into the latch 304. The Disable signal also prevents the contents of counter 308 from being transferred into the latch 310. If, on the other hand, the comparator 306 senses that the score stored in the register 302 exceeds that stored in the latch 304, no Disable signal is sent to delay 312, and thus, when the Clock signal is sensed at the latch 304, the contents of register 302 are transferred to the latch 304, and the contents of the counter 308 are moved to the latch 310.

In the recognizer mode of operation, upon completion of the comparison of the new data matrix with all reference patterns stored in the memory 207, the latch 310 contains the address in the memory 207 wherein the reference pattern most closely resembling the new data matrix is located. The data stored in the latch 310 is placed on one input of a summer 236 (FIG. 3), and is added to the contents of an address of first word ROM 238, providing the correct address of the memory 207 wherein that particular reference pattern is stored. This address is utilized by a Read/Write Select 242 in reading that reference pattern from the memory 207 and indicating this pattern to the user on a user prompter 248. The reference pattern read from the memory 207 appears on the outputs of the recognizer circuit 36 of FIG. 1, where it is input to the output buffer 38 for use in interconnected systems operation.

In addition to determining the highest score for previously compared reference patterns during the recognition mode, the highest score discriminator 118 of FIG. 2 provides a means of determining when all reference patterns have been tested against the incoming data matrix. This is accomplished by storing the total number of reference pattern words in a number of words register 314 of FIG. 4, and comparing the contents of this register with the continuously updated word counter 308 in a comparator 316. If this comparison shows that all of the reference patterns have not been compared against the incoming data matrix, no signal is output from the comparator 316, and the continued comparison of new reference patterns is accomplished. However, upon discrimination that all reference patterns have been compared to the new data matrix, the comparator 316 sends a Reset signal to the vocabulary word number counter 240 of FIG. 3, causing that counter to be reset to an initial value of zero. Once the counter 240 is reset, the system remains in a static state until a clocking signal, occurring when data is present, is present at the switch 208 and OR gate 245, indicating that a further new data matrix is being loaded into the shift register 202.

In the training mode of operation, the contents of the latch 310 (FIG. 4) are utilized to indicate the particular address of the memory 207 containing the reference pattern most similar to the new data matrix currently being trained. This data is placed on the inputs of a summer 236 (FIG. 3) and combined with the contents of a ROM 238 to provide the correct address location of the memory 207 for locating this reference pattern. A Read/Write Select 242 utilizes this address in reading that pattern from the memory 207 and in prompting the user through a user prompter 248 to show the particular word being trained. The ROM 238 contains the address in a general purpose memory at which the memory 207 begins.

In addition, the contents of the latch 310 are placed in the pattern repeat detector 120 of FIG. 2, particularly being stored in a Y-buffer 318 of FIG. 4. The results of a comparison of the most recent two outputs from the latch 310 in a comparator 332 will be combined with the output of the counting means 124 which maintains a history of previous accepted values from the latch 304 to purge the entire training pattern from the system if three erroneous or unacceptable words are sequentially entered into the system during the training of any one particular reference pattern.

In accomplishing this, the contents of the latch 304 are input to a comparator 320, where they are compared with an acceptable threshold value, as described previously in reference to the minimum score gate 122 of FIG. 2.

The minimum score gate 122 operates in response to the training pass look-up table, which includes a ROM 322 (FIG. 4) in which is stored a table of thresholds based upon training pass number. The table of thresholds contained in the ROM 322 varies between a low magnitude, or easily surpassed threshold value, to a much higher value which requires much more accuracy between the incoming word and stored reference pattern in order to allow admittance of the incoming data word. In an exemplary device, stored magnitudes may generally vary from a minimum of zero to a maximum of 128. Threshold values contained in the table may typically vary from a low of 100 for a single first pass to a high of 118 for training passes number 32 through 63. These values are not constant and may be varied by the user through the use of a scaler 324 of FIG. 4. User variability of these values is important, since lower quality input signals, such as telephone transmissions, require a lower threshold in order to gain admittance to the system. On the other hand, high quality audio transmissions may justify use of higher threshold values in order to provide adequate screening of new incoming data.

A latch 326 stores the threshold value corresponding to the training pass number of the incoming data currently being tested. The comparator 320 determines whether the current data score value from the latch 304 exceeds the minimum threshold requirement, as contained in the latch 326. If the comparator 320 finds that the current data score value exceeds the threshold value of the latch 326, a Merge Enable signal is generated by the comparator 320, which signal appears on the input of the AND gate 232 of FIG. 3. Additionally connected to the inputs of the AND gate 232 are a serial shift register 230 containing the serial representation of the new data matrix, and a parallel-to-serial shift register 228 containing the reference pattern from the location in memory 207 corresponding to the address pointer contained in the latch 310.

With the Merge Enable signal on the gate 232, the Clocking-During-Training signal causes the serial shifting of data from the registers 230 and 228 into the AND gate 232. During this serial shifting, the output of the AND gate 232 will be high only when those corresponding bits of the patterns in the registers 230 and 228 are both high. Thus, the ANDing action of the gate 232 merges the newly accepted data with the reference pattern most closely resembling that data, and creates a new reference pattern, stored in a serial-to-parallel register 234, which contains zeros in all locations except those wherein the corresponding bits of the two compared patterns were both logical ones. The new reference pattern contained in the register 234 is placed in a buffer 226, from which location it is placed into the memory 207 by the Read/Write Select 220 in a memory location corresponding to the address of the reference pattern which it is now replacing.

If the comparator 320 determines that the current data sample magnitude does not equal or exceed the threshold value from the latch 326, then a No signal is generated, and appears on the input of a minimum score fail counter 330. This No signal would cause the counter 330 to increment, except that, if it is assumed that this is the first failure to achieve the threshold, the Y-buffer 318 contains data from this initial training pass, and no data has yet been transferred into the Y-1 buffer 334. Thus, the comparator 332 determines that the contents of buffers 318 and 334 are not equivalent. Therefore, the comparator 332 generates a No signal, which appears on the Reset input of the counter 330, preventing the incrementing of that counter by the signal from the comparator 320.

Since the comparator 320 determines that the incoming data sample did not meet the minimum threshold requirements of the latch 326, the incoming data is not merged or otherwise added to its most similar reference pattern contained in memory 207. No further system management occurs with respect to the incoming data which was stored in the register 202 of FIG. 3.

The user is prompted by Not Accepted prompter 334 (FIG. 4) that the previously tested data was not accepted, and this serves as an indication to him that he should input another utterance to be used as a training sample for the particular pattern being trained. The new sample from the user will appear on the inputs to register 202 of FIG. 3, and be handled in a manner as described above through the storage of the new score value in the latch 304 and the reference pattern being trained in the latch 310.

At this point, the previous pattern address contained in the Y-buffer 310 is transferred to Y-1 buffer 334 and the current pattern address contained in the latch 310 is loaded into the Y-buffer 318. If the pattern address of the reference pattern most resembling the pattern being trained is identical to that of the most previous training pattern stored in the Y-1 buffer 334, the comparator 332 will indicate that the contents of the buffers 318 and 334 are identical, and fail to generate a No signal. Thus, no signal will appear on the Reset input to the counter 330. At this same time, the score value in the latch 304 is seen on the inputs to the comparator 320 which compares this value with the current value contained in the latch 326, which was obtained from the ROM table of thresholds 322.

If the comparison in the comparator 320 indicates that the new value does not meet the magnitude requirements of the threshold in the latch 326, a No signal is generated from the comparator 320, which passes through a delay 336 during the time period that the Reset signal from the comparator 332 is being removed. With the Reset signal on the input of the counter 330 removed, the No signal emerging from delay 336 now causes the counter 330 to increment. The count value in fail counter 330 is compared with a constant value of two from a ROM 338 in a comparator 340. Since the value in the counter 330 does not yet equal the value of two, in ROM 338 comparator 340 provides a No signal, and no system response occurs. Again, the user is prompted by the Not Accepted prompter 334, indicating that his most recently submitted data was again rejected.

The above process continues, with the user inputting another attempt at training the device. Since the training mechanism is still attempting to train the same reference pattern which was attempted in the previous two trials, the same system functions occur upon the submission of new data as were described above, through the point of comparison in the comparators 332 and 320.

If the reference pattern remains the same as is stored in the Y-buffer 318 and the Y-1 buffer 334, and if the incoming data again does not meet the threshold requirements of the latch 326, the comparator 320 will again produce a No signal, which will propagate through the delay 336 and appear on the input to the minimum score fail counter 330, causing that counter to increment. Since this is a third in a series of three sequentially entered data signals not meeting the magnitude requirements of the threshold value contained in the latch 326, the minimum score fail counter 330 equals a value of two, which, when compared in the comparator 340 with the constant value of two contained in the ROM 338, a Yes signal is generated from the comparator 340 which permits a Clocking During Training signal to be passed through an AND gate 342 and to appear on the Reset input of the counter 344, causing that counter to be reset to a value of zero.

It should be noted that if, after two previous samples have not met the threshold level of the latch 326 causing the counter 330 to increment, a data sample is accepted by the comparator 320, the Merge Enable signal is passed through the OR gate 346, resetting the counter 330, so that any future data failing the threshold level will represent the first of a required three sequential failures in order to purge the entire reference pattern corresponding to the pattern address contained in Y-buffers 318 and 334.

When a new reference pattern is read from memory 207 for training purposes, the number of training passes which have been experienced in generating that pattern is read through the Read/Write Select device 220 and is loaded into a counter 344 and a latch 348. This value will serve as a base for comparison on the number of necessary training patterns remaining in order to achieve a desired number of training passes for the particular reference pattern.

The user determines the number of passes by which he wishes to update each reference pattern, and this number is stored in a Number-of-Updating-Passes register 351. The latch 348 contains the number of training passes of the current reference pattern. The values in the registers 351 and 348 are added in a summer 349, with the resulting sum being stored in a latch 350. The value in the latch 350 equals the total number of training passes which the particular reference pattern being trained will have upon completion of this training session.

Upon the generation of a Merge Enable signal from the comparator 320, the AND gate 232 (FIG. 3) is enabled, allowing the merging of the newly accepted data and the pre-existing reference pattern, as was previously explained. In addition, this Merge Enable signal appears on the Enable input of an incrementer 352, causing a signal to appear on buffer 226 which is passed through the Read/Write selector 220, updating by a count of one the number of training passes corresponding to the reference pattern currently being trained contained in memory 207. The Merge Enable signal further appears on the Increment input to the counter 344, causing that counter to increase by one number.

At this time, the contents of the counter 344 and of the latch 350 are compared in a comparator 354. If the values are not equal, no change results and the system continues in operation as previously described. However, at some point after incrementing the counter 344 several times, the comparator 354 will find that the contents of the counter 344 and the latch 350 are equal, indicating that the total number of desired training passes for the current reference pattern have been reached. At this time, the comparator 354 generates a Yes signal, which enables the AND gate 244, incrementing the vocabulary word counter 240 to initiate training of the next vocabulary word in a manner identical with that described above. In addition, the signal from the comparator 354 appears at counter 356 causing that counter to increment. The comparator 358 compares the contents of the counter 356 with the contents of the Number Of Words register 314 to determine whether training has been completed for all reference patterns contained in the memory 207. If the comparator 358 finds that the contents of the counter 356 and the register 314 are not equal, no change in system response is experienced. However, upon determining that the contents of the counter 356 and the register 314 are equal, the comparator 358 generates a Yes signal, which resets the counter 356 to a value of zero and enables the End of Training display to notify the user that all reference patterns have received the desired number of training passes.

As was previously indicated, after three data samples have failed to meet the minimum threshold requirement of the latch 326 in the comparator 320, the AND gate 342, which corresponds to gate 126 of FIG. 2, produces a signal which resets the counter 344 of FIG. 4. This causes the counter 344 to retain a value of zero, indicating that the reference pattern currently being trained must be completely retrained from a value of zero training passes to a number of training passes equaling the desired number stored in the latch 350. In addition, the signal from the gate 342 enables Number-Of-Training-Passes-Equal-Zero ROM 128 to generate a signal which is placed in the buffer 226 and causes the Select device 220 to write a value of zero in the number of training passes storage area corresponding to the particular reference pattern which was being trained.

It is evident from the description of this device that it provides a significant improvement over prior art systems, particularly in the area of device training. With reference to FIG. 2, it is noted that the training pass score minimum look-up table 136 provides a means for varying the minimum threshold value for acceptance for incoming data according to the number of previously accepted data samples corresponding to the incoming data. With relatively few samples, the threshold value is low, permitting acceptance of a broad range of signals similar in format to the existing reference patterns. As the number of training passes for a given reference pattern increases, the threshold value also increases, since the reference pattern itself has become more normalized and is able to recognize a broader range of incoming signals. Therefore, system accuracy is retained while permitting easier access to the system for data in the initial stages of pattern training.

The minimum look-up table 136 also provides a means of scaling the internal threshold values to meet the requirements of incoming signals. This is particularly important when signals are of a lower quality, such as those received over telephone or data transmission lines. However, the scaler may be increased to narrow the acceptable range of incoming signals generated from other precise sources, such as the microphone response to a human voice, or its equivalent.

The pattern repeat detector 120, No counter 124, and gate 126 combine to provide a means of protecting system integrity by purging a reference pattern after three sequential entries of data which is similar to the reference pattern but does not meet the minimum threshold standards as generated in look-up table 136. This prevents the continued storage of data which does not correspond closely to current reference signals, and thus would be useless in the system. Zero writer 128 also acts in response to the signal from gate 126 to purge the non-useful reference pattern from the system.

The training pass counter 124 provides a means of maintaining the uniformity of reference pattern quality throughout the entire reference pattern system by insuring that all reference patterns have been subjected to the same number of training passes. This provides a uniform threshold value for recognition of incoming data and results in a higher quality of system performance and a reduced number of acceptances of erroneous data.

The training pass counter 124 further provides for the updating of all system reference patterns at any time in response to an indication of such desire by the user. This allows all reference patterns to be changed to accept tiring voices or new voices and it provides the same number of training passes with this updated training for all reference patterns contained in the system.

Although a preferred embodiment of the invention has herein been disclosed, it is to be understood that the present disclosure is made by way of example and that variations are possible without departing from the subject matter coming within the scope of the following claims which subject matter is regarded as the invention.

Having described the operation of a preferred embodiment of the system, it is noted that an additional preferred embodiment would be the implementation of this device in a software form for use in software applications, such as a microprogrammed computer. Such a software implementation is demonstrated by the following source program which may be run on a Data General Nova computer to accomplish the implementation of this device in software.

```
===== ==========================================

--- ROM SOURCE AS OF:

------------

NREC                RECOGNITION PACKAGE WITH MDATA LOGIC

.NREL

.TITL   NREC

.ENT    TRAIN, SETREF, RECOG, COUNT, RPSTO, TABLE, UT

.EXTN   NEXT, SCLR, RETRC

.EXTD   UBAS, RBAS, NBAD, RTHL, TFLG, IPRM, WDNO

.EXTD   NTRN, LSWD, FSWD, WACT, PSTR, PDEV, USER      ;==========1.j=========

NAME            USE                              GIVEN

TRAIN   LOOPS SEQUENTIALLY FROM BEGIN

WD TO END WD TO GET DATA         BEGIN AND END WORD

FROM EACH UTTERANCE AND CALLS    NUMBER TO TRAIN

SETREF TO CREATE AND STORE       NUMBER OF PASSES

NEW REF PAT NBA ARRAY

SETREF  CALLED BY TRAIN TO CREATE

STORE NEW REF PAT  NBA CODED BUFFER ADDRESS

ARRAY FROM OLD REF PAT  REF VECTOR ADDRESS

CODED DATA

RECOG   GETS SCORE FOR SINGLE WORD       WORD # TO TEST

ACCORDING TO MDATA LOGIC         ADDRESS OF CODED DATA
```

```
COUNT       USED BY RECOG TRAIN TO          ;A 16-BIT WORD
            COUNT MATCHING BITS              AND COUNT SO FAR

;================================================================

; MODIFIED 8/20/75 BY JCB TO USE NSTATE FOR RBAS,NBAS

; MODIFIED 9/17/75 BY JCB TO USE PDEV FOR PROMT DEVICE AND
;    TIE IN NEW PROMT CALL

; MODIFIED 9/23/75 BY JCB TO RETURN CODED DATA BUFFER IN TRAIN

; MODIFIED 5/12/78 BY RDB TO DO RECOGNITION DURING TRAIN

; MODIFIED 5/25/78 BY RDB TO LIMIT REJECTS TO 3 IN TRAIN

; MODIFIED 6/19/78 BY RDB TO USE HIGH SPEED DIVIDE

; MODIFIED 10/17/78 BY RDB TO USE #TRAINING PASSES

; MODIFIED 10/19/78 BY RDB TO CONTROL THRESHOLD IN TRAIN

; MODIFIED 3/27/79 BY RDB TO ALLOW USER OVERRIDE OF TRAIN THRES

;================================================================

;================================================================
TRAIN:
        CALL            JSR     @1TRN
                        NPASS           ;NO. OF TRAIN PASSES
                        FRSWD           ;FIRST WD NO.
                        LSTWD           ;LAST WD NO.
                        ;NOT DONE YET RETURN
                        ;DONE RETURN
```

```
IF TFLAG(U) IS 0 THEN:
        SET TFLAG(U)=1
        NTRAN(U)=NPASS
        BEGWD(U)=FRSWD
        ENDWD(U)=LSTWD

IF NO DATA IS AVAILABLE THEN:
        RETURN (NOT DONE)
ELSE:
        CALL GETPER
        RETURN CODED DATA BUFFER
                IF LAST WORD THEN:
                        DECREMENT PASS NO.
                        IF LAST PASS THEN:
                                SET TFLAG(U)=0
                                AC1=FINAL VALUE OF WDNO
                                RETURN DONE
                        ELSE:
                                SET WORD NO.=BEGIN WD
                                OUTPUT PROMPT
                                RETURN (NOT DONE)
                ELSE:
                        INCREMENT WORD NO.
                        OUTPUT PROMPT
                        RETURN (NOT DONE)
                END
```

=====================================================================

=====================================================================

TABLE: TAB          ; REJECT THRESHOLD FOR TRAINING

```
TAB:    100.            ; AFTER 1 PASS
        105.            ; 2 - 3 PASSES
        110.            ; 4 - 7 PASSES
        113.            ; 8 - 15 PASSES
        115.            ; 16 - 31 PASSES
        118.            ; 32 - 64 PASSES

TRAIN:  STA     3,TR1
        LDA     2,UBAS
        SUBZL   1,1
        STA     1,TP
        LDA     3,UTFLG ; USER TRAIN FLAG TABLE
        LDA     0,USER  ; USER NUMBER
        ADD     0,3
        LDA     0,0,3
        MOV     0,0,SZR ; TEST USER TRAIN FLAG
        JMP     DATAV   ; WAS NOT 0
        JSR     @IFTI
        LDA     0,USER
        LDA     2,KN1
        ADD     0,2
        LDA     0,D3
        STA     0,0,2   ; INIT REJECT COUNTER
        LDA     1,PDEV
        LDA     2,TOFF
        AND     2,1
        MOVS    1,1
        LDA     2,PSTR
        ADD     2,1
        STA     1,PG
        JMP     PNXPG

DATAV:  JSR     @INEXT  ; IS DATA AVAILABLE
        JMP     @NTDN   ; NO, NOT DONE RETURN

STA     1,TMP
```

```
        SUBZL   1,1
        STA     1,TMP   ; ODD RECOG FLAG=1
        LDA     2,URAS
        LDA     0,W5    ; INDEX FOR WORD#
        ADD     2,0     ; ADDRESS FOR WORD#
        STA     0,WNUM
        JSR     @RCOG   ; GO ONE WORD RECOGNITION
TMP:    0
WNUM:   0
        LDA     1,TMP   ; RESTORE CODAD
        STA     1,CODAD
        MOV     0,0,SNR ; PASS ONE?
        JMP     CONT    ; YES
        LDA     2,URAS
        LDA     1,TFLG,2        ; LOAD FLAG FOR TRAIN THRESHOLD OPTION
        MOV     1,1,SNR ; RTHL IF NON ZERO
        JMP     FIG     ; TABLE DRIVEN IF ZERO
        LDA     1,RTHL,2        ; LOAD USER CONTROLED RTHL
        JMP     REJ
FIG:    LDA     1,USER  ; NO, FIGURE THRESHOLD
        LDA     2,TMP2
        ADD     1,2
        LDA     1,0,2   ; # TRAIN PASSES IN AC1
        SUB     3,3
HERE:   MOVZR   1,1,SNR ; DIVIDE #PASSES BY 2
        JMP     OUT     ; DONE?
        INC     3,3     ; NO, COUNT POWER OF 2
        JMP     HERE
OUT:    LDA     2,TABLE ; LOOK IN TABLE
        ADD     3,2
        LDA     1,0,2   ; REJECT THRESHOLD IN AC1
REJ:    SUBZL   0,1,SZC ; CHECK SCORE RELATIVE TO THRESHOLD
        JMP     CONT    ; PASS
        SUB     1,1     ; FAIL
```

```
              STA    1,TP   ;CLEAR RECOGNITION FLAG
              LDA    0,KNT
              LDA    1,USER
              ADD    1,0
              DSZ    0,0
              JMP    CONT0
              JMP    CONT
DK:    0
DQ:    0
TCOR:  .ADR
PK:    .BLK   1
INEXT: NEXT
NXPS:  NXPAS
NTDN:  NOTDN
HGH:   HIGH
TRT:   .BLK   1
UTHLG: UT
UT:    .BLK   5
KNT:   KOUNT
KOUNT: .BLK   5
TMP2:  TEMP
TEMP:  .BLK   5
TP:    0
TOFF:  377
RCOG:  RECOG
CONT:  LDA    0,USER
       LDA    0,KNT   ;RESET REJECT COUNTER
       LDA    ?,UT?   ;USER TRAIN FLAG
       ADD    0,0
       ADD    0,?
       LD     0,??
       STA    0,0,0
```

```
        SUBZL    0,0
        STA      0,0,?
        LDA      2,CODAD
        LDA      0,MBREG?
        SUBZL    1,1
        SUBZ     1,0         ;
        LDA      1,CODAD     ;
        ADDZL    0,0         ;#4
        ADDZL    0,0         ;#4
        LDA      2,RBASE?    ;ACZ=USER REFBASE
        ADD      2,0
        JSR      @13FR       ;GET REFP.
;
;       RETURN CHEC. DATA BUFFER
;
CON12:  LDA      0,CODAD     ;DECR. BUFFER ADDR
        LDA      1,BK?
        SB?      ?,?
        STA      0,CODAD
        JMP      @1?C?
        0.
CODAD:  .BLK     1           ;ADDRESS OF DATA
;
        LDA      3,URAG
        LDA      0,TP        ; CHECK RECOGNITION FLAG
        MOV?     0,0,SNR     ; PASS?
        JMP?     THERE       ; NO
        LDA      0,MB        ; YES RESTORE NBA TO ACC
        LDA      2,USER
        LDA      3,TP?
        ADD      1,2
        LDA      1,0,2
        INC      1,1         ; INCREMENT PASSES ON NOB
        MOVS     1,?
```

```
        ADD     1,0         ;ADD SPACES TO NBA
        LDA     1,NBAD,3    ;GET PTR NBA RAY
        SUBZL   0,0
        SUB     0,1         ;FORM ADDRESS
        LDA     2,NB,3      ;STORE NB IN NBA ARRAY
        ADD     1,2
        STA     0,0,2
;
THERE:  LDA     0,ESWD,3
        LDA     1,CONC,3
        ???     ?,?,SNR     ;LAST WORD OF GROUP
        JMP     CHKPAS      ;YES, CHECK FOR LAST PASS
        LDA     0,?P        ;INCREMENT WORD COUNTER BY
PTC1:   ADD     ?,?         ;RECOGNITION FLAG
        STA     1,CONC,3
;
        STA     1,WDC
        JSR     ???         ;GET NBA
        JSR     ?????       ;SEPERATE STRAIN PASSES
        LDA     ?,USER
        LDA     1,TRY?
        ADD     ?,?
        ???     ?,?         ;STORE STRAIN PASSES
        LDA     ?,UBAS
        LDA     1,NTRN,3    ;??????? TRAINING ?????
        ????    ?,?,???     ;???.GE. NEEDED
        JMP     THER?       ;YES
        LDA     2,PDEV
        LDA     0,??
        LDA     ?,????      ;????? ????? ? IN AC1
        ???     0,2,SNR     ;MAG DEV. SELF-SCAN
        JSR     @JSCR       ;CLEAR SELF-SCAN
        LDA     0,UBR?
        ???     ?,?         ;??? PROMPT
```

```
        BCC                 ; [illegible], [illegible]

INC             ...  ...RN NOT DONE

[illegible]  SUBZL     0, 0
        STA       0, TP
        JMP       ...
CHKPAS  ...       ...         ...CK RECOG FLAG AT LAST WORD
        ...       ...      ; PASS?
        ...       ...      ; NO  DO INCREMENT WORD ACCORDINGLY LDA       3, UTFLG
        LDA       0, USER
        ADD       0, 3
        LDA       0, 0, 3   ; LOAD USER TRAIN FLAG
        MOVL      0, 0, SNC ; DONE?
        JMP       NXPAS     ; NO
        SUBO      0, 0      ; YES  PASS FINAL WDNO IN AC1
        STA       0, 0, 3   ; USER TRAIN FLAG=AC0 DONE TRAINING
        LDA       3, TRT
        JMP       1, 3      ; DONE RETURN
;
NXPAS:  LDA       3, ...
        SUBZR     1, 1
        LDA       2, UTFLG
        LDA       0, USER
        ADD       0, 2
        STA       1, 0, 2   ; ... USER TRAIN FLAG=1
        LDA       1, FSWD, 3 ; START NEXT PASS
        ...       0, 0
        ...       ...
```

```
            STA     1,WDNO,3        ;WITH FIRST WORD
            JMP     THERE
;
NOTON:      JMP     @.?-            ;NOT DONE RETURN
;
NB:         .BLK    1
.SETR:      SETREF
THRE:       RTRN
NBA:        LDA     2,?...          ;GET CURRENT NBA# PACKED WITH #TR PASSES
            LDA     1,....,2
            LDA     2,WDNO,2
            SUBZL   0,0
            SUBZ    0,?
            ADD     ?,?
            LDA     2,...           ;A... WI.. NO. TRAIN IN AC?
            JMP     0,.?
SWBES:      MOVS    2,0             ;MOVE AND SWAP BYTES
            LDA     1,....          ;LOAD RIGHT BYTE MASK
            AND     ?,?             ;L... BYTE IN AC0
            AND     2,3             ;R.... BYTE .. AC1
            JMP     0,3

===============================================================

SETREF
                    CALL    LDA     0,RL..D         ;REF PAT ADDRESS
                            LDA     1,CODAD         ;CODED DATA ADDRESS
                            JSR     SETR..
                            STANDARD RE....

R=AC0
                    J=AC1
                    NB=0
```

FOR 8 REFERENCE BLOCKS

FOR 1ST MEMBER OF REF PAT:

NEW REFP(AC0)=OLD REFP (AND) CODED DATA

FOR 2ND MEMBER OF REF PAT:

NEW REFP(AC1)=OLD REFP (AND) DATA COMPLEMENT

AC1=AC0 (XOR) AC1 (INPUT TO COUNT)

CALL COUNT (OUTPUT IN AC0)

NEW NB = OLD NB + AC0

NEXT PAIR

STORE REFP AND REFP+1 AT K AND K+1

NEXT REFERENCE BLOCK

RETURN

===============================================================

===============================================================

```
SETREF: STA     3,SRT
        STA     0,K       ;REFP ADDR
        STA     1,J       ;CODED DATA ADDR
        SUBO    0,0
        STA     0,NB
        LDA     0,DB
        STA     0,L
        LDA     0,TP      ;REJECT FLAG?
        MOV     0,0,SNR
        JMP     RESET     ;RESET REF PATTERN WITH CURRENT UTTERANCE
RPBEG:  LDA     1,@J      ;GET CODED DATA
        LDA     0,@K      ;GET REFP
        AND     1,0
        STA     0,@K      ;NEW REFP
;
        COM     1,1       ;COMPLEMENT CODED DATA
        ISZ     K
        LDA     2,@K      ;GET REFP+1
```

```
        AND     2,1
        STA     1,@K        ;NEW REFP#1

CON     0,0         ;REFP (OR) REFP#1
        AND     0,1
        ADC     0,1
        LDA     0,NB
        JSR     @TCNT       ;# OF 1'S IN AC1 ADDED TO AC0
        STA     0,NB

ISZ     J           ;NEXT CODAD
        ISZ     K           ;NEXT REFP ADDR
        DSZ     L
        JMP     RPBEG
;
        JMP     @SRT
RESET:  LDA     0,@J        ;RESET REF PATTERN WITH CURRENT UTTERANCE
        STA     0,@K        ;MIMICKS RPBEG ABOVE
        CON     0,0
        ISZ     K
        STA     0,@K
        ISZ     J
        ISZ     K
        DSZ     L
        JMP     RESET
        SUBZR   0,0         ;SET #TR PASSES TO 1
        MOVS    0,0         ;SET NBA TO 128
        SUBZL   1,1
        MOVS    1,1
        ADD     1,0         ;PACK NBA #
        LDA     0,UTRCS
        LDA     1,NBAD,0
```

```
            SUBZL   2, 2
            SUBZ    2, 1
            LDA     2, WDNO, 3
            ADD     1, 2
            STA     0, 0, 2
            JMP     @SRT
;
SRT:        .BLK    1
K:          .BLK    1
J:          .BLK    1
L:          .BLK    1
ICNT:       COUNT
DG:         0.
ICDD:       @CODAD
ENDID:      .BLK    1
CDAD:       CODAD
;
;==========================================================
;==========================================================
RECOG:

CALL:   JSR     RECOG
                CODAD           ;ADDR OF CODED DATA
                WDNO            ;ADDR OF WORD NUMBER
                STANDARD RETURN

AT RETURN, AC0 WILL HAVE CORRELATION SCORE

RECOG:  GET CODAD
        GET WDNO
        REF-AD=USER(BASE)+WDNO*16
        CLEAR SUM

FOR 8 CODED DATA BLOCKS
                AC0=REFP  AC1=CODED DATA
```

```
COMPUTE AC0=AC1 (AND) AC0
AC2=REFP+1   AC1=CODED DATA COMPLEMENT
COMPUTE AC1=AC2 (AND) AC1
COMPUTE AC1=AC0 (IOR) AC1 (FOR INPUT TO COUNT)
CALL COUNT
AND OUTPUT TO SUM

NEXT CODED DATA BLOCK

SCALED SCORE=NBA/(NBA-SUM+1) IN AC0
RETURN

COUNT:   FOR 16 BITS
              <AC1
              IF (TOP BIT OF AC1 IS ON)
                    THEN: INCR AC0
         NEXT BIT
         RETURN
```

========================================================================

========================================================================

```
RCODE:  STA     3,RTN
        LDA     0,0,3    ;GET CODAD
        STA     0,@CDAD
        LDA     0,1,@3   ;GET WDNO
        STA     0,WDN
        LDA     3,UBAS
        STA     0,WDNO,3
        SUBZL   1,1
        SUBZ    1,0      ;=-1 ???
        ADDZL   0,0
```

```
        ADDZL   0,0         ;REFAD=REFBAS+16*WDNO
        LDA     1,RBAS,3    ;AC1=USER REF BASE
        ADD     0,1
        STA     1,REFAD
;
        SUBO    0,0
        STA     0,SUM       ;CLEAR SUM
;
        LDA     0,DB
        STA     0,XR
;
RL:     LDA     1,@CDD
        LDA     0,@REFAD
        AND     1,0         ;AND DATA WITH REFP

COM     1,1         ;COMPLEMENT DATA
        ISZ     REFAD
        LDA     2,@REFAD
        AND     2,1         ;AND COMP.DATA WITH REFP+1

COM     0,0         ;AC0 (IOR) AC1 TO AC1
        AND     0,1
        ADC     0,1
        LDA     0,SUM
        JSR     COUNT       ;# OF 1'S IN AC1 ADDED TO AC0
        STA     0,SUM
;
        ISZ     @CDAD       ;NEXT CODAD
        ISZ     REFAD       ;NEXT REFP ADDR
        DSZ     XR
        JMP     RL
;
; SCALE ANSWER
;
```

```
*********THIS PORTION IS DIFF. FROM NREC.CON*******
        JSR     NBA
        LDA     1,MASK  ; MASK OFF #TR PASSES
        AND     1,2
        MOV     2,0,SNR ; WAS TRAINED
        JMP     RETN    ; NOT YET
        LDA     0,DB
        SUB     0,2     ; NBA-8
        LDA     1,SUM   ; GET SUM
        SUB     0,1     ; SUM-8
        MOVS    1,1     ; SUM*256
        MOVZR   1,1     ; SUM*128
        STA     0,SUM
                ======1,0============
        SUB     0,0     ; CLEAR SCORE
                ======END OF EDIT======

********************************************

;       DIVISION: 128*(SUM-8)/(NBA-8), ANS. IN AC0

MOVS    2,2
SHFT:   MOVZR   2,2
        MOVZL   0,0
B1:     SUB     2,1
        MOVZL#  1,1,SNC
        JMP     B2
        ADD     2,1,SKP
B2:     INC     0,0
        DSZ     SUM
        JMP     SHFT
;
RETN:   LDA     3,RRT
        JMP     2,3     ; RETURN. AC0 HAS NORMALIZED SCORE
;
```

```
MASK:   177
SUM:    .BLK    1
MON:    .BLK    1
XR:     .BLK    1
RRT:    .BLK    1
```
==================================================================

==================================================================

```
COUNT:  LDA     2,D16
        STA     2,BCNT

CLP:    MOVL    1,1,SZC
        INC     0,0
        DSZ     BCNT
        JMP     CLP
        MOVL    1,1         ;TO BE LIKE IT CAME IN
        JMP     0,3         ;RETURN
D16:    16.
BCNT:   .BLK    1
```
==================================================================

RPSTO       RP'S TO ONES (REF PATS TO ONES)

```
RPSTO:
        CALL    JSR     RPSTO
                FRSWD           ;FIRST WD NO.
                LSTWD           ;LAST WD NO.
                STANDARD RETURN

RPSTO:  GET BEGIN WORD
```

```
                GET END WORD
                SET WDNUM=BEGIN WORD

FOR EACH WDNUM CALCULATE REF ADDR
                    FOR 16 REF PAT BLOCKS:
                        SET REF PAT= -1
                    NEXT REF PAT BLOCK

NEXT WDNUM, IF NOT ENDWD
                RETURN, IF ENDWD
;
;=================================================================
;
;       INITIALIZE REF PATS TO ONES & NBA'S TO ZERO
;
RPSTO:  STA     0, WDNUM
        STA     1, ENDWD
;
RPLP1:  LDA     0, WDNUM
        LDA     2, UBAS
        LDA     1, NBAD, 2
        MOV     0, 2
        SUBZL   0, 0
        SUBZ    0, 2
        ADD     1, 2
        SUB     0, 0
        STA     0, 0, 2
        LDA     0, WDNUM
        SUBZL   2, 2
        SUBZ    2, 0     ;=====1.2====
        ADDZL   0, 0
        ADDZL   0, 0
        LDA     2, UBAS
        LDA     1, RBAS, 2
```

```
          ADD      1,0
          STA      0,REFAD  ;REFAD=BASE+16*WDNUM
;
          LDA      0,D16
          STA      0,L
          ADC      0,0      ;AC0=-1
;
RPLP2:    STA      0,@REFAD
          ISZ      REFAD
          DSZ      L
          JMP      RPLP2
;
          LDA      0,ENDWD
          LDA      1,WDNUM
          SUBO     1,0,SNR  ;LAST WORD OF GROUP
          JMP      RPDON    ;YES. DONE RETURN
          INC      1,1      ;NO. INCR WORD #
          STA      1,WDNUM
          JMP      RPLP1
RPDON:    JMP      0,3
;
WDNUM:    .BLK     1
INBA:     NBA
IBYTE:    BYTES
REFAD:    .BLK     1
HIGH:     STA      3,RHGH   ;FIND MAX #TR PASSES SO FAR
          SUBZL    0,0
          LDA      3,UBAS
          STA      0,WDNO,3
          SUB      0,0
          STA      0,BIG
LOOP:     JSR      @INBA    ;GET NBA#
          JSR      @IBYTE   ;UNPACK #TR PASSES IN AC0
          LDA      1,BIG
```

```
SUBZ#   0,1,SNC  ; BIGGEST?
STA     0,BIG    ; YES
LDA     3,UBAS
ISZ     WDNO,3
LDA     0,WDNO,3
LDA     1,WACT
SUBZ    0,1,SZC  ; DONE?
JMP     LOOP     ; NO
LDA     0,BIG    ; YES
LDA     1,NTRN,3          ; ADD REQUESTED INCREMENT
ADD     1,0
STA     0,NTRN,3
JMP     @RHGH
RHGH:   .BLK    1
BIG:    .BLK    1
        .END
```

What is claimed is:

1. Apparatus for signal pattern recognition, comprising:

means for storing a plurality of reference data patterns;

means for comparing a signal pattern with said reference data patterns for recognition; and means for updating a selected one of said reference data patterns comprising:

means for inputting a training signal pattern;

means for comparing said training signal pattern with each said reference data pattern to generate a score signal for each said reference data pattern indicative of the similarities therebetween;

means for selecting the reference data pattern with the highest score for similarity with said training signal pattern;

means for combining said selected reference data pattern with said training pattern to produce a new reference data pattern; and means for replacing said reference data pattern with said new reference data pattern in said storing means if said score signal is above a predetermined level without affecting any other said reference data patterns regardless of the scores of said other reference data patterns in comparison with said training signal pattern.

2. Apparatus for signal pattern recognition, as defined in claim 1, wherein said updating means further comprises:

means for adjusting said predetermined level.

3. Apparatus for signal pattern recognition, as defined in claim 1, wherein said updating means further comprises:

means for counting the number of sequential training signal patterns which produce score signals below a predetermined level when compared against said selected reference data pattern with the highest score for similarity; and means responsive to said counting means for initiating additional training of said selected reference data pattern when the count reaches a predetermined number.

4. Apparatus for signal pattern recognition, comprising:

means for storing plural reference data patterns;

means for adjusting and comparing a training signal pattern with said plural reference data patterns for recognition;

means for combining a plurality of training signal patterns to produce each of said plural reference data patterns; and means for controlling said inputting and combining means to combine the identical number of training signal patterns for each of said plural reference data patterns.

5. Apparatus for signal pattern recognition as defined in claim 4 wherein said controlling means comprises:

means for storing a number equal to the number of training signal patterns previously combined in said combining means to produce said reference data pattern;

means for storing a desired number of training signal patterns;

means for comparing said stored number of previously combined training signal patterns with said stored desired number of training signal patterns; and means responsive to said comparing means for controlling said inputting and combining means.

6. Apparatus for signal pattern recognition comprising:
a memory storing multiple reference data patterns;
means for comparing said signal patterns against said multiple reference data patterns for recognition; and
a circuit for storing said multiple reference data patterns in said memory, comprising:
means for inputting and storing new signal patterns for cumulative use in generating one of said multiple reference data patterns;
means for combining said new signal patterns with said one reference data pattern previously stored in said memory to produce a new reference data pattern;
means for replacing said one reference data pattern previously stored with said new reference data pattern in said memory; and
means for sequencing said inputting and storing means to assure that said inputting, combining and merging means operate an identical number of times on each of said multiple reference data patterns in said memory.

7. A signal pattern encoder and classifier comprising:
a transducer;
signal processing means coupled to the output of said transducer for providing spectrum samples representative of the signal output of said transducer;
event encoding logic means coupled to the output of said signal processing means for computing the difference between a current spectrum sample and the last previous spectrum sample accepted by said event encoding logic means;
means responsive to said event encoding means for rejecting said current spectrum sample if said difference is below a predetermined value;
timing and control means coupled to said signal processing means and said event encoding logic means;
reference pattern memory means coupled with said timing and control means; and
pattern classification means connected to said event encoding means, said timing and control means and said reference pattern memory means wherein said pattern classification means comprises:
means for notifying the apparatus user to submit additional data;
means responsive to said notification means for causing samples to be taken of the additional data;
means responsive to incoming samples for comparison and coding for those samples;
storage means connected to said comparison and coding means for storing the coded data;
means connected to said reference pattern memory means for comparison of incoming data with said reference patterns in said reference pattern memory means and assigning a comparison value to said incoming data for each said comparison;
means responsive to said assigned comparison value for selecting the reference data pattern with the highest comparison value with said incoming data and for determining whether the assigned comparison value for said selected reference data pattern against said incoming data sample is acceptable; and means responsive to said determining means and connected to said reference pattern memory means for storing said incoming data sample into said reference pattern memory means replacing only said selected reference data pattern with a new reference data pattern generated by combining said selected reference data pattern with said incoming data sample and leaving all other reference data patterns unaffected regardless of the comparison value assigned to any of said nonselected reference data patterns.

8. A signal pattern encoder, as defined in claim 7, further comprising:
second storage means retaining a count of the number of incoming samples combined to form each said reference data pattern; and
third storage means retaining a count of the number of sequential samples not meeting said predetermined threshold value for a selected reference data pattern.

9. A signal pattern encoder, as defined in claim 8, wherein said pattern classification means further comprises:
means responsive to said third storage means for discarding a selected reference data pattern when the count in said third storage means reaches a predetermined number for said selected reference data pattern.

10. A signal pattern encoder, as defined in claim 8, wherein said pattern classification means further comprises:
means responsive to said second storage means for varying said predetermined threshold in accordance with the count stored in said second means.

11. An apparatus for signal pattern recognition, comprising:
means for storing a reference data pattern;
means for comparing a signal pattern with said reference data pattern for recognition;
means for updating said reference data pattern comprising:
means for inputting a training signal pattern;
means for comparing said training signal pattern with said reference data pattern to generate a score signal indicative of the similarities therebetween;
means for combining said reference data pattern with said training pattern to produce a new reference data pattern; and
means for replacing said reference data pattern with said new reference data pattern in said storing means if said score signal is above a predetermined level; and
means for adjusting said predetermined level including:
means for counting the number of said training signal patterns which have been combined by said combining means to produce said reference data pattern; and
means for setting said predetermined level as a function of the output count of said counting means.

12. An apparatus for signal pattern recognition, as defined in claim 11, wherein said setting means increases said predetermined level in response to an increased count output from said counting means.

13. An apparatus for signal pattern recognition, as defined in claim 11, wherein said setting means comprises:
a read only memory.

14. Apparatus for signal pattern recognition, comprising:
means for storing a reference data pattern;
means for comparing a signal pattern with said reference pattern for recognition;
means for updating said reference data pattern comprising:
means for inputting a training signal pattern;
means for comparing said training signal pattern with said reference data pattern to generate a score signal indicative of the similarities therebetween;
means for combining said reference data pattern with said training pattern to produce a new reference data pattern;
means for replacing said reference data pattern with said new reference data pattern in said storing means if said score signal exceeds a predetermined level;
means for counting sequential training signal patterns which produce score signals from said comparing means below a predetermined level; and
means responsive to said counting means for initiating additional training of said reference data pattern; and wherein said initiating means comprises:
means for storing a number equal to the number of training signal patterns previously combined in said combining means to produce said reference data pattern;
means for operating said training signal pattern inputting means in response to said number of previously combined training signals; and
means for setting said number of training signal patterns in said storing means to a lower value in response to said counting means.

15. Apparatus for signal pattern recognition, as defined in claim 14, wherein said setting means sets said number of training signal patterns in said storing means to zero.

16. A signal pattern encoder and classifier comprising:
a transducer;
signal processing means coupled to the output of said transducer for providing spectrum samples representative of the signal output of said transducer;
event encoding logic means coupled to the output of said signal processing means for computing the difference between a current spectrum sample and the last previous spectrum sample accepted by said event encoding logic means;
means responsive to said event encoding means for rejecting said current spectrum sample if said difference is below a predetermined value;
timing and control means coupled to said signal processing means and said event encoding logic means;
reference pattern memory means coupled with said timing and control means;
pattern classification means connected to said event encoding means, said timing and control means and said reference pattern memory means wherein said pattern classification means comprises:
means for notifying the apparatus user to submit additional data;
means responsive to said notification means for causing samples to be taken of the additional data;
means responsive to incoming samples for comparison and coding for those samples;
storage means connected to said comparison and coding means for storing the coded data;
means connected to said reference pattern memory means for comparison of incoming data and assigning a comparison value to said incoming data;
means responsive to said assigned comparison value for determining whether the particular coded incoming data sample is acceptable above a predetermined threshold value; and
means responsive to said determining means and connected to said reference pattern memory means for storing said incoming data sample into said reference pattern memory means; and
wherein said threshold value is varied automatically in response to the number of incoming samples used to generate the data in said reference pattern memory means.

* * * * *

UNITED STATES PATENT AND TRADEMARK OFFICE
CERTIFICATE OF CORRECTION

PATENT NO. : 4,297,528

DATED : October 27, 1981

INVENTOR(S) : Richard D. Beno

It is certified that error appears in the above-identified patent and that said Letters Patent are hereby corrected as shown below:

Column 4, line 43, change "112" to --122--.

Column 5, line 15, change "promoter" to --prompter--.

Column 7, line 15, change "320" to --302--.

Column 52, line 48, change "adjusting" to --inputting--.

Signed and Sealed this

Second Day of March 1982

[SEAL]

Attest:

GERALD J. MOSSINGHOFF

*Attesting Officer*   *Commissioner of Patents and Trademarks*